US011634929B1

(12) United States Patent
Francisco Felipe

(10) Patent No.: US 11,634,929 B1
(45) Date of Patent: Apr. 25, 2023

(54) SYSTEM FOR A HAND ATTACHED SUCTION CUP FOR THE TOUCHLESS OPENING OF A DOOR

(71) Applicant: Francisco Francisco Felipe, Ft. Myers, FL (US)

(72) Inventor: Francisco Francisco Felipe, Ft. Myers, FL (US)

( * ) Notice: Subject to any disclaimer, the term of this patent is extended or adjusted under 35 U.S.C. 154(b) by 335 days.

(21) Appl. No.: 17/141,947

(22) Filed: Jan. 5, 2021

(51) Int. Cl.
E05B 1/00 (2006.01)

(52) U.S. Cl.
CPC ................... *E05B 1/0015* (2013.01)

(58) Field of Classification Search
CPC ..... B25B 11/007; F16B 47/006; E05B 1/0015
See application file for complete search history.

(56) References Cited

U.S. PATENT DOCUMENTS

| | | | | | |
|---|---|---|---|---|---|
| 3,913,964 | A * | 10/1975 | Lukeman | ............. | B66C 1/0225 211/89.01 |
| 4,593,947 | A * | 6/1986 | Yocum | .................. | B65G 47/91 294/187 |
| D289,793 | S * | 5/1987 | Blake | ........................ | D23/309 |
| 5,087,005 | A * | 2/1992 | Holoff | ................ | A47G 23/0225 248/205.8 |
| 5,806,816 | A * | 9/1998 | Hull | ..................... | A47B 81/005 248/205.6 |
| 5,909,758 | A * | 6/1999 | Kitamura | ............. | F16B 47/006 248/205.8 |
| 6,488,321 | B1 * | 12/2002 | Huang | .................. | B25B 11/007 294/187 |
| 7,004,521 | B2 * | 2/2006 | Ishii | ...................... | B25B 11/007 294/187 |
| 8,522,482 | B2 * | 9/2013 | Buck | .................... | E05B 1/0069 49/386 |
| 8,973,877 | B2 * | 3/2015 | Chen | .................... | F16B 47/006 248/363 |
| 9,079,715 | B2 | 7/2015 | Finck | | |
| 10,190,345 | B2 * | 1/2019 | McCullough | ......... | E05C 19/188 |
| 2012/0042475 | A1 * | 2/2012 | Chiang | ................ | E05B 1/0053 16/413 |
| 2014/0000170 | A1 * | 1/2014 | Buck | .................... | E05B 1/0053 49/353 |
| 2015/0306622 | A1 * | 10/2015 | Ashworth | ............ | F16M 13/022 248/205.8 |
| 2022/0010583 | A1 * | 1/2022 | Brenner | ................... | G09F 3/00 |
| 2022/0010584 | A1 * | 1/2022 | Brenner | ............... | E05B 1/0069 |
| 2022/0154761 | A1 * | 5/2022 | Van Esch | ............. | F16B 47/006 |

* cited by examiner

Primary Examiner — Jeffrey O'Brien
(74) Attorney, Agent, or Firm — Sanchelima & Associates, P.A.; Christian Sanchelima; Jesus Sanchelima

(57) ABSTRACT

A method and device for the touchless opening of a door includes a finger held or attached suction cup device which is secured to the fingers using a strap and buckle. Furthermore, the suction up is placed against the door and held to the door using a vacuum force at which point the door can be pulled open and the suction device can be released after use. The device further includes a strap cover which provides a protective surface to a user's hand when operating the device. Additionally, a tag fastener is coupled to a distal end of the suction cup and inserted through the strap cover and mounted to a top end of the suction cup. The tag fastener provides a accessible means for a user to unmount the device from a door surface by applying an upward force.

10 Claims, 6 Drawing Sheets

US 11,634,929 B1

SYSTEM FOR A HAND ATTACHED SUCTION CUP FOR THE TOUCHLESS OPENING OF A DOOR

BACKGROUND OF THE INVENTION

1. Field of the Invention

The present invention relates to a system for the touchless opening of a door and, more particularly, to a system for the touchless opening of a door that includes a suction cup device mounted to a user's hand which receives a door to be pulled open or closed.

2. Description of the Related Art

Several designs for a system for the touchless opening of a door have been designed in the past. None of them, however, include a method and device for the touchless opening of a door including a finger held or attached suction cup device which is secured to the fingers using a strap and buckle. Furthermore, the suction up is placed against the door and held to the door using a vacuum force at which point the door can be pulled open and the suction device can be released after use. The device further includes a strap cover which provides a protective surface to a user's hand when operating the device. Additionally, a tag fastener is coupled to a distal end of the suction cup and inserted through the strap cover and mounted to a top end of the suction cup. The tag fastener provides an accessible means for a user to unmount the device from a door surface by applying an upward force. The upward force will release the suction of the device and remove the vacuum seal resulted from the suction cup. It is known that due to the ongoing Covid-19 pandemic, people are often wary of the surfaces they come in contact with. One of the most often contacted surfaces are doors that are opened. These doors may be public doors, restroom doors, refrigerator doors, any door that utilizes heavy human contact. Therefore, there is a need for a device to allow for the universal touchless opening of a door.

Applicant believes that a related reference corresponds to U.S. Pat. No. 7,004,521 issued for a handheld suction cup device for moving objects using the suction cup. Applicant believes that another related reference corresponds to U.S. Pat. No. 9,079,715 issued for a lifting device comprising a pair of suction cups and a handle. However, the cited references differ from the present invention because they fail to disclose the finger attached suction cup which is secured to the fingers using a strap and buckle. The suction cup is placed against the door and held to the door using a vacuum force which may be utilized to pull the door open. Further the device includes a tag fastener which is adapted to provide a accessible demounting system for the device when mounted to a door.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a suction cup door opening system which prevents a user from coining in direct contact with a door, thereby eliminating the spread of germs and bacteria resulting in the touching of the door containing foreign bacteria.

It is another object of this invention to provide a suction cup door opening system which provides an easy to use mounting and release system, wherein the suction cup is received by a door, a downward force by the user then secures the device to the door and an upward force will release the suction force.

It is still another object of the present invention to provide a suction cup door opening system aimed to decrease the spread of viruses such as Covid-19 by reducing contact surfaces in a user's environment.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
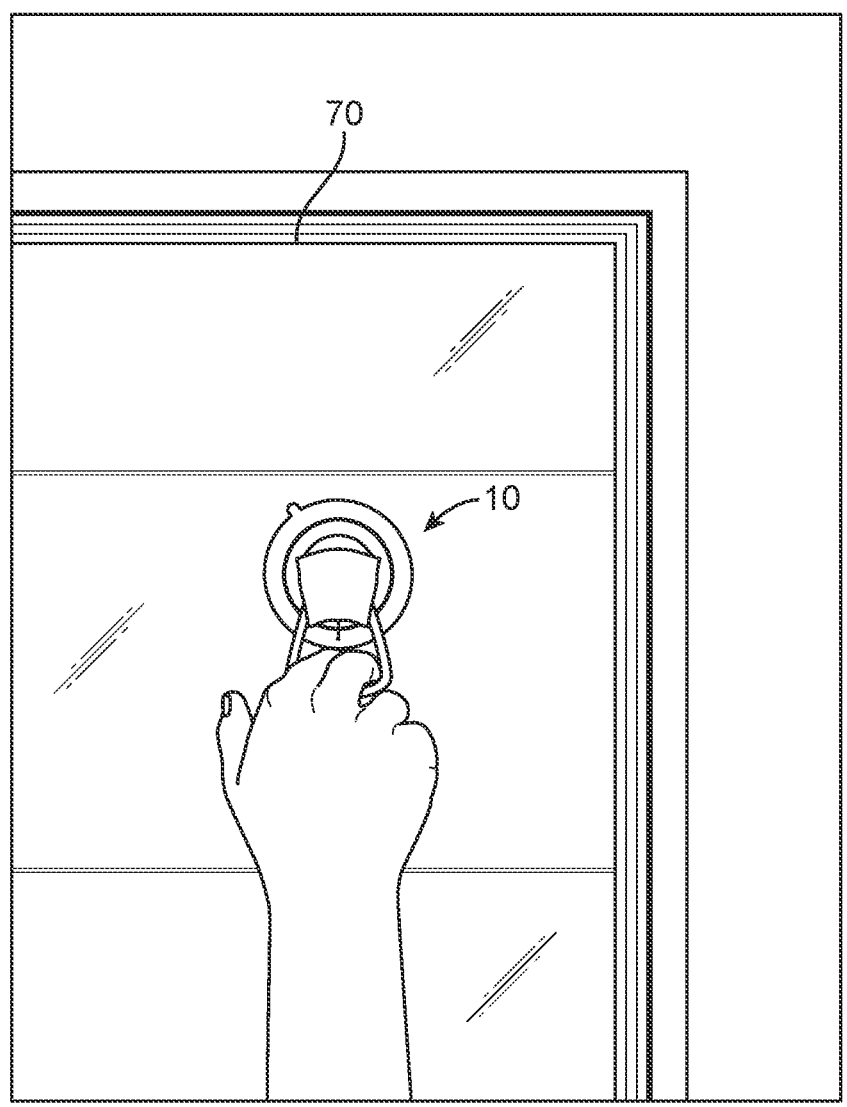
FIG. 1 represents an isometric operational view of suction cup door opening system 10 depicting a user applying a downward force to secure the suction cup device to a door.

Referring now to the drawings, where the present invention is generally referred to with numeral 10, it can be observed a suction cup door opening system 10 which basically includes a suction cup assembly 20, a strap assembly 40, and a cover assembly 60.

Figure 4:
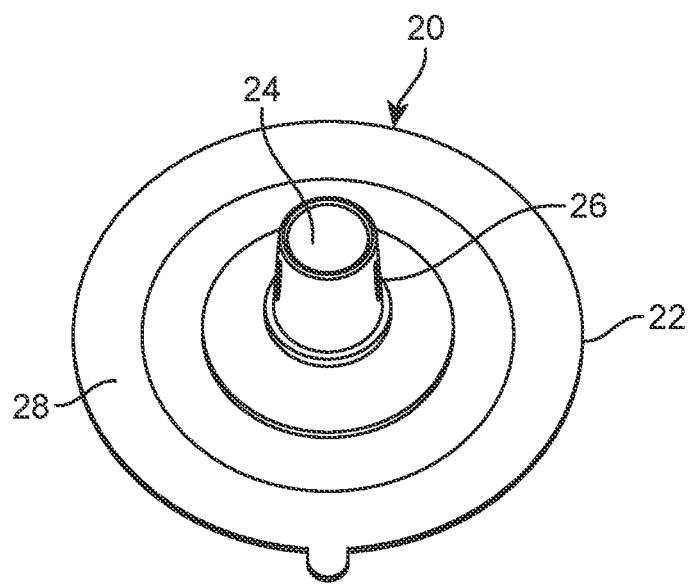
FIG. 4 is an isometric representation of suction cup assembly 20 in accordance to an embodiment of the present invention.

Suction cup assembly 20 includes a suction cup member 22 configured to suction onto various surfaces. In one embodiment, suction cup member 22 is provided as a circular suction cup member as observed in FIG. 4 of the provided drawings. Additionally, suction cup member 22 may be made of a rubber material or any other material to facilitate a suction vacuum on a surface. Further as observed, suction cup member 22 may include a lip portion extending outwardly from an edge thereof. This lip member will aid a user in detaching the suction cup when attached to a surface. Suction cup member 22 further includes a top portion 24 which extends upwardly from a top surface thereof. In one implementation, top portion 24 is provided as a cylindrical structure that is perpendicular to the top surface of the suction cup member 22. Further, top portion 24 may be made of the same rubber material as suction cup member 22 and may be provided as an integral component of suction cup member 22. Other embodiments may feature a removable top portion 24. Top portion 24 further includes an opening 26 which extends entirely through top portion 24. In one embodiment, opening 26 is provided as being circular in shape and of a suitable diameter to receive strap assembly 40. Additionally, suction cup member 22 includes an outer edge 28 representing an outer most circular surface area of the cup member. The outer edge 28 will receive elements of the cover assembly 60 to provide an effective resting aid for a user's fingers. In one embodiment, the suction cup assembly 20 or the other assemblies may be colored and painted with a Vinyl and Fabric specialty coating sold under the trademark name of Dupli-Color.

Figure 5:
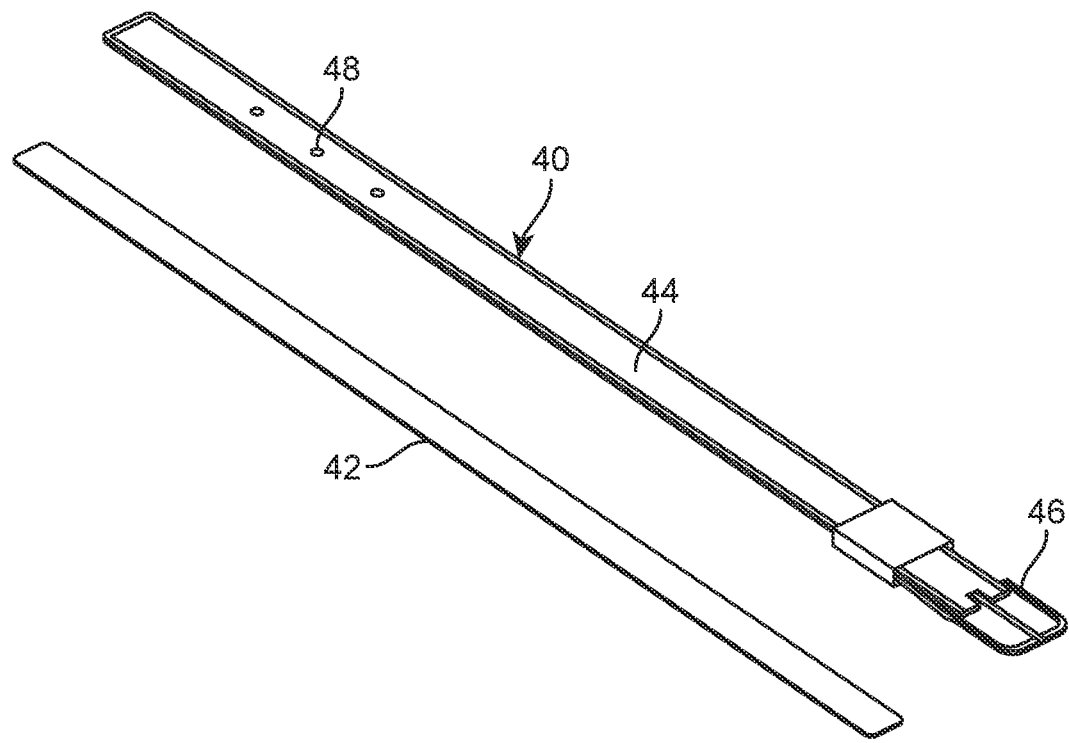
FIG. 5 shows an isometric view of strap assembly 40 in accordance to an embodiment of the present invention.

Strap assembly 40 may be observed in FIG. 5 of the provided drawings. As observed, strap assembly 40 includes a first strap 42 and a second strap 44. In the present embodiment, both straps are provided as circular straps. However, other embodiments may feature straps of different shapes and sizes. In one embodiment, first strap 42 is provided as being a rectangular cloth or leather strap or foam strap having a length of approximately eight inches in length. Second strap 44 is also provided as a rectangular cloth or leather strap or foam strap having a length of approximately eight inches. However, second strap 44 includes a buckle 46 mounted to a distal most end. Additionally, openings 48 are provided along a proximal end of second strap 44. Openings 48 are configured to interlock with buckle 46 in order to form a secure attachment means.

Figure 7:
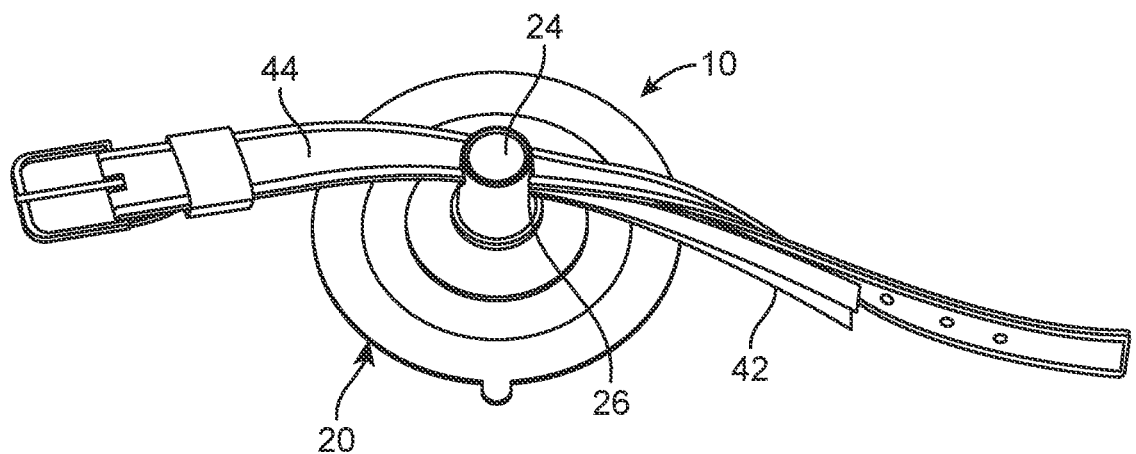
FIG. 7 illustrates an isometric view of strap assembly 40 mounted to suction cup assembly 20 in accordance to an embodiment of the present invention.

In the present embodiment, second strap 44 is first inserted within through hole opening 26 of top portion 24. This configuration may be observed in FIG. 7 and FIG. 8 of the provided drawings. After second strap 44 has been inserted, first strap 42 is then inserted through opening 26 and beneath second strap 44. This action results in the configuration observed in FIG. 7 of the provided drawings. First strap 42 will later aid in the securing of cover assembly 60 when assembled thereon. Second strap 44 will be formed into a loop to comfortably receive a user's fingers as observed in FIGS. 1-3.

Figure 6:
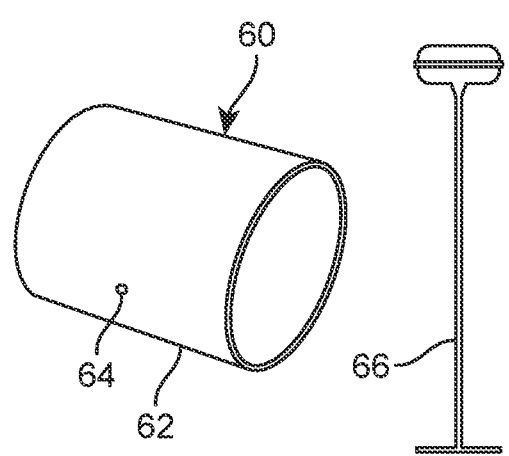
FIG. 6 illustrates an isometric view of cover assembly 60 in accordance to an embodiment of the present invention.

Cover assembly 60 includes a cover 62 made of a cloth, leather or foam material to provide a comfortable surface for the placement of a user's fingers. In one embodiment, cover 62 is provided as having a cylindrical shape as observed in FIG. 6 of the provided drawings. Cover 62 is a cylindrical ring with a hollow interior. Cover 62 further includes a through hole opening 64 which extends entirely through the cover member 62. Cover assembly 60 further includes a tag fastener 66 being made of an elastic plastic material. In one implementation tag fastener 66 includes a vertical portion with horizontal portions mounted on opposing distal ends. The horizontal portions are provided as being perpendicular to the vertical portion. In one implementation tag faster 66 is provided as having a length of approximately 1 inch. The length of the tag fastener 66 entirely depends on the diameter of the suction cup that is used.

Figure 8:
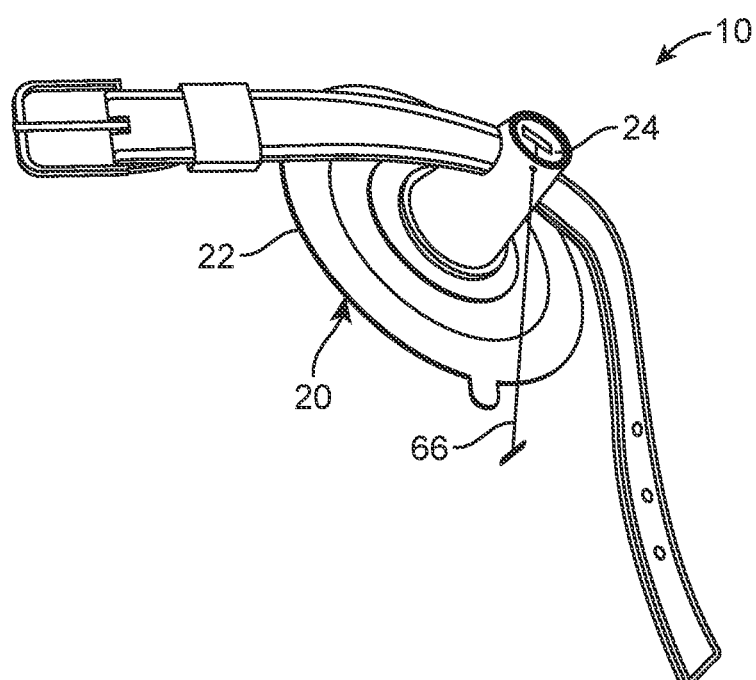
FIG. 8 represents an isometric view of a tag fastener of cover assembly 60 mounted to a top end of suction cup assembly 20 in accordance to an embodiment of the present invention.
Figure 9:
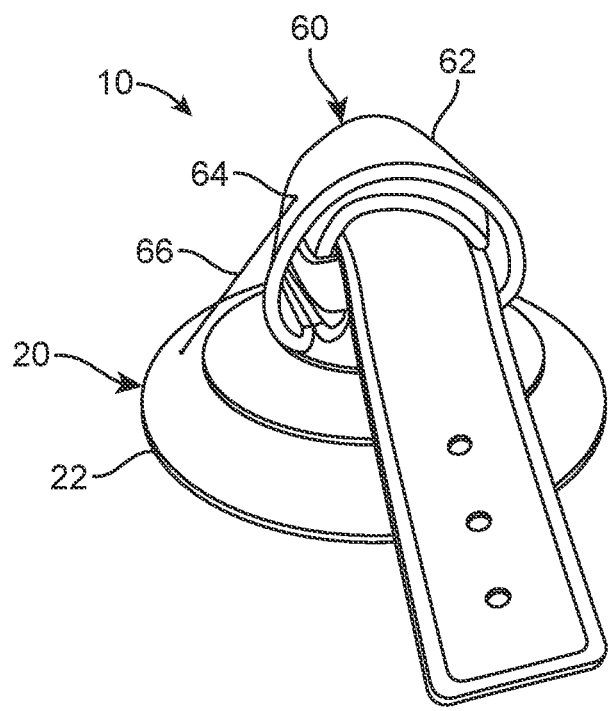
FIG. 9 shows an isometric view of a cover from cover assembly 60 mounted through the tag fastener, wherein the tag fastener is then mounted to an outer edge of the suction cup.
Figure 10:
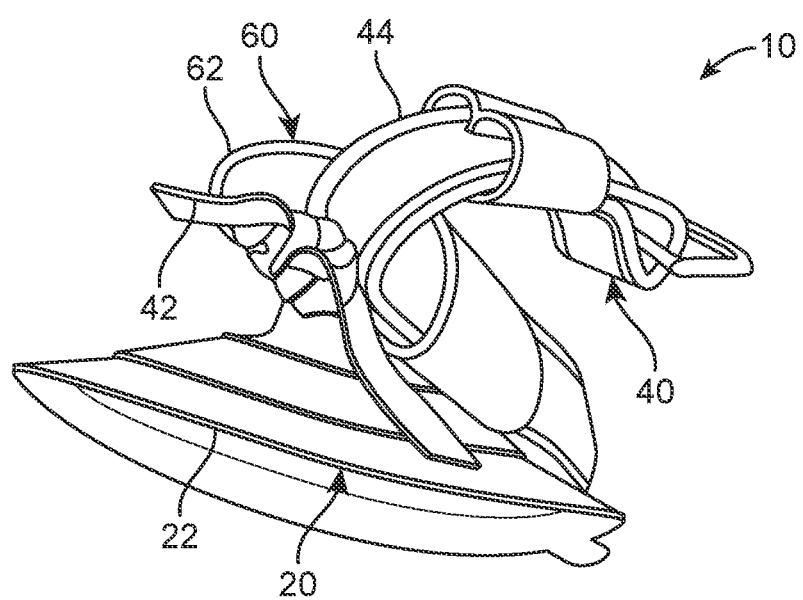
FIG. 10 illustrates an isometric view of a knot formed from strap assembly 40 to secure the cover to the suction cup.

In the present embodiment, tag fastener 66 is mounted to top portion 24 of suction cup 22. Tag fastener 66 may be mounted through means of a tag fastener gun to securely insert and secure tag fastener 66 to top portion 24. FIG. 8 accurately depicts the configuration of tag fastener 66 mounted to top portion 24. Once secured, the through holes 64 of cover 62 then receive the free end of the tag fastener 66. After the cover 62 is successfully inserted, tag fastener 66 is then secured to outer edge 28 of suction cup 22 as observed in FIGS. 3 and 9. It is important that there is tension present in the tag fastener 66 when secured to the suction cup 22. The tension will aid in releasing a vacuum force that is created when utilizing the device. Once, the tag fastener is secured, the first strap 42 is then used to secure cover 62 onto the suction cup member 22. In one embodiment, as observed in FIG. 9, a knot is formed with the free ends of first strap 42 to secure cover 62. Cover 62 serves as a protective boundary between a user's fingers and the top portion 24 of the suction cup 22. As observed in FIGS. 1 and 2, when applying force onto a door 70, the fingers may come in contact with the top end of the suction cup 22. Cover 62 provides a comfortable surface for a user when utilizing the system 10.

In the present embodiment, system 10 is utilized to open a door without having to make direct physical contact with the door. That is, a user need not place their skin directly onto the door to open it. This prevents the transfer of germs and bacteria that may be present when opening a door. To open the door, a user applies a force to the door using suction cup 22 to create a vacuum force between the door and the suction cup. The user may then apply a downwardly inclined force as observed in FIG. 1 to effectively open the door 70. If a user desires to release the suction cup member 22, the user may then apply an upwardly angled force as observed in FIG. 2 of the drawings. This upward force will result in the tag fastener 66 engaging with the outer edge 28 of the suction cup 22. As a result, the tension in the tag fastener 66 will result in pulling suction cup 22 away from the door 70 thereby releasing the vacuum force securing suction cup 22 to the door 70. This provides an easy removal method and prevents having the user come into direct contact with the door when trying to remove suction cup 22.

The present invention further includes a method for the touchless opening of a door 100 which includes a first step 120, a second step 140, a third step 160, and a fourth step 180.

In the first step 120, a finger held suction cup device is provided. This device is synonymous with the device of the previously disclosed system. The device includes a strap having a buckle which is inserted through the device and adapted to be secured to a user's fingers for operation. In the present embodiment, the device further includes a tag fastener which extends from an outer edge to a top portion of the suction cup device.

Second step 140 includes applying a force to an outer door surface with the finger held suction cup device. The force is applied to the door until said suction cup device is coupled to the door through a vacuum force. With the vacuum force the suction cup device will stick to the door without the aid of further force from a user. It is preferred that the force be applied near a door handle of the door.

The third step 160 includes applying a downward force in a pulling motion at an incline as observed in FIG. 1 of the provided drawings. The inclined downward force will then engage the door into an open position. As a result, a user is able to effectively open the door without the need of physically touching the handle of the door.

Figure 2:
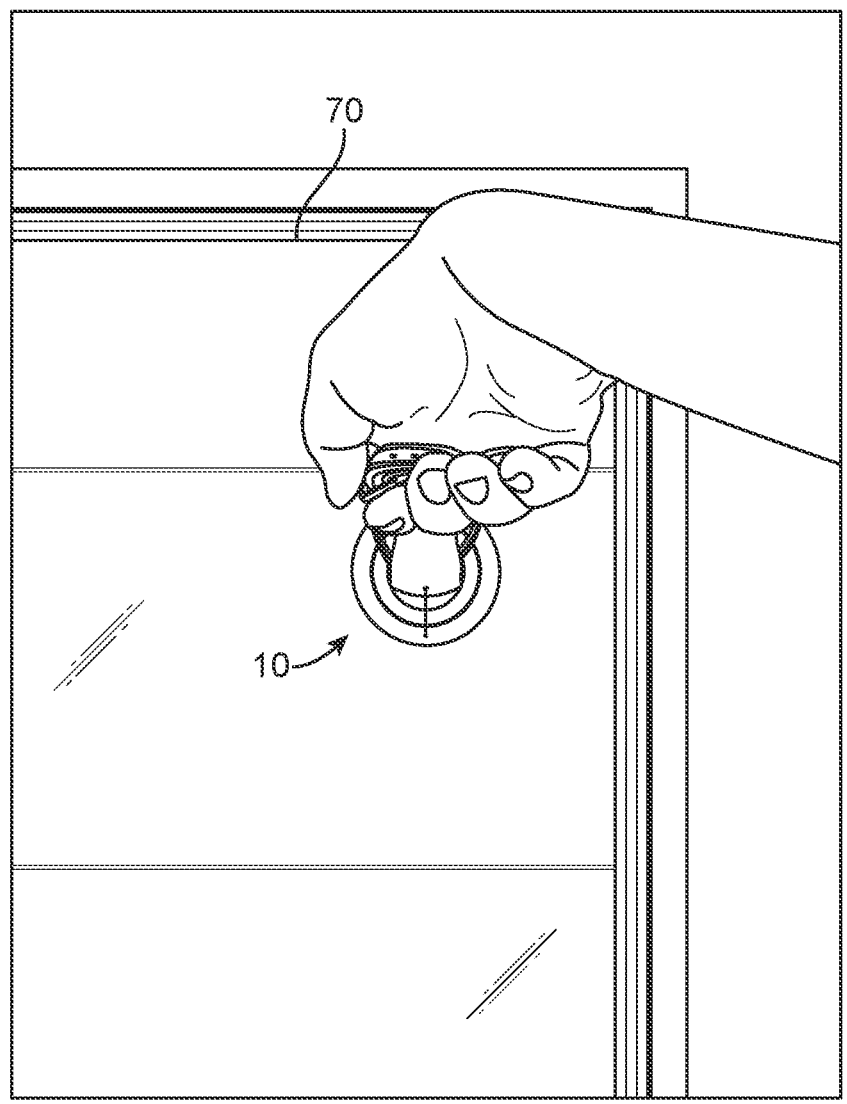
FIG. 2 shows another isometric operational view of suction cup door opening system 10 depicting a user applying an upward force to release the suction cup device from the door.
Figure 3:
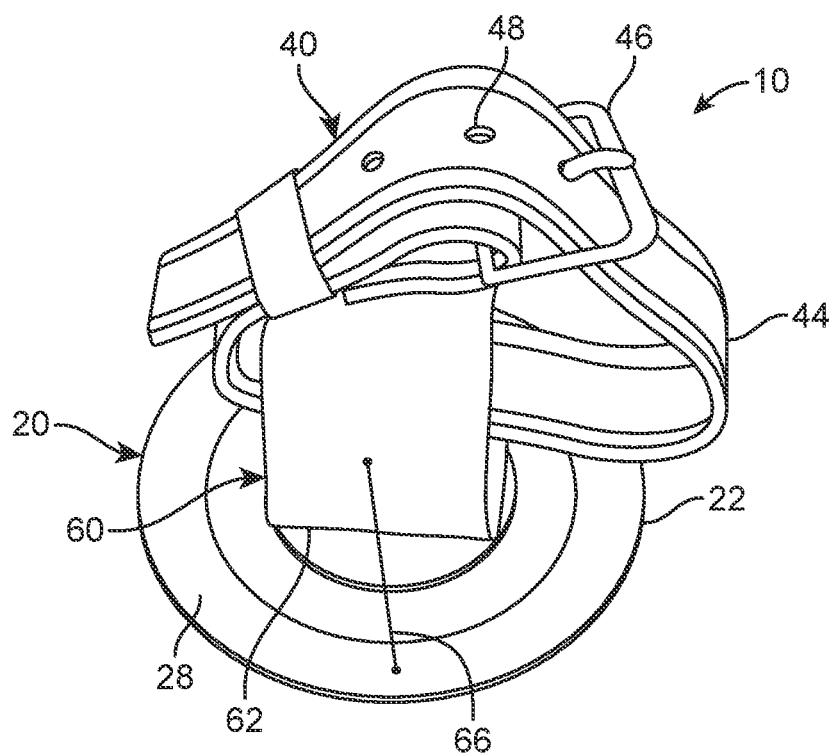
FIG. 3 illustrates an isometric assembled view of suction cup door opening system 10 in accordance to an embodiment of the present invention.

The fourth step 180 includes applying an upward force in a pulling motion at an incline as observed in FIG. 2 of the provided drawings. The inclined upward force then engages the tension from the tag fastener to then pull on the outer edge of the suction cup device. As a result, the tag fastener effectively pulls the suction cup away from the door surface thereby releasing the vacuum force that resulted in second step 140. A user may then easily remove the suction cup device from the door for later use.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A suction cup door opening system, comprising:
    a) a suction cup assembly including a finger held suction cup device adapted to be secured to a user's fingers, wherein said finger held suction cup device includes a top portion having a through hole and an outer edge;
    b) a strap assembly including a first strap and a second strap, said second strap including a buckle and a plurality of openings, wherein said first strap and said second strap are inserted through said through hole of said top portion; and
    c) a cover assembly including a cover and a fastener, said cover having a through hole extending there through, wherein said fastener is mounted to a top end of said top portion, said fastener then being inserted through said cover and mounted to said outer edge of said finger held suction cup device.

2. The suction cup door opening system of claim 1 wherein said top portion is a cylindrical structure with a flat top end.

3. The suction cup door opening system of claim 1 wherein said suction cup assembly is made entirely of a rubber material.

4. The suction cup door opening system of claim 1 wherein said first strap and said second strap are rectangular cloth or leather straps.

5. The suction cup door opening system of claim 1 wherein said second strap is above said first strap when inserted within said top portion.

6. The suction cup door opening system of claim 1 wherein said fastener is a tag fastener.

7. The suction cup door opening system of claim 1 wherein said finger held suction cup device is mounted to an outer surface of a door to create a vacuum force, wherein said door is then pulled into an open position.

8. The suction cup door opening system of claim 1 wherein said cover is a hollow cylindrical ring structure.

9. The suction cup door opening system of claim 6 wherein said tag fastener includes a vertical portion and two horizontal portions.

10. A suction cup door opening system, consisting of:
    a) a door having an outer surface;
    b) a suction cup assembly including a suction cup made of a rubber material and having a circular shape, said suction cup having a top portion extending upwardly from a middle portion of said suction cup, wherein said top portion is a cylindrical structure having a through hole, said top portion being perpendicular to a top surface of said suction cup, said top portion having a flat top end, said suction cup further including an outer edge on an upper surface;
    c) a strap assembly including a first strap and a second strap, wherein said first strap is a cloth or leather strap having a rectangular shape, wherein said second strap is a cloth or leather strap including a buckle at a distal most end, said second strap further including a plurality of openings, wherein said first strap and said second strap are inserted within said through hole of said top portion, said second strap being located above said first strap when inserted into said through hole; and
    d) a cover assembly including a cover and a tag fastener, wherein said cover is a hollow cylindrical member made from a cloth or leather material, wherein said cover further includes a through hole extending there through, wherein said tag fastener is mounted to said top portion of said suction cup, said tag fastener then being inserted through said through hole of said cover, said tag fastener then mounted to said outer edge of said suction cup while having said cover mounted there through, wherein said first strap is then inserted through said cover to secure said cover to a top end of said suction cup, wherein said suction cup is mounted to said outer surface of said door to create a vacuum force wherein said suction cup is pulled to open said door.

\* \* \* \* \*